US009879595B2

United States Patent
Konomi et al.

(10) Patent No.: US 9,879,595 B2
(45) Date of Patent: Jan. 30, 2018

(54) EXHAUST CONTROL APPARATUS FOR ENGINE

(71) Applicant: Mazda Motor Corporation, Aki-gun, Hiroshima (JP)

(72) Inventors: Kenjiro Konomi, Hiroshima (JP); Nobuo Yunoki, Aki-gun (JP); Kotaro Takahashi, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 187 days.

(21) Appl. No.: 14/821,180

(22) Filed: Aug. 7, 2015

(65) Prior Publication Data

US 2016/0090928 A1 Mar. 31, 2016

(30) Foreign Application Priority Data

Sep. 25, 2014 (JP) .................................. 2014-195411

(51) Int. Cl.
*F02B 33/44* (2006.01)
*F02M 25/07* (2006.01)
(Continued)

(52) U.S. Cl.
CPC ............ *F02B 37/24* (2013.01); *F02D 41/005* (2013.01); *F02D 41/0007* (2013.01);
(Continued)

(58) Field of Classification Search
CPC ........ F02B 37/24; F02M 26/05; F02M 26/06; F02M 25/071; F02M 25/0712;
(Continued)

(56) References Cited

U.S. PATENT DOCUMENTS 6,543,227 B2 * 4/2003 He ........................ F02B 37/24
60/602
7,593,828 B2 * 9/2009 Wang ..................... F02B 37/24
702/138
(Continued)

FOREIGN PATENT DOCUMENTS

JP H09280119 A 10/1997
JP H11125147 A 5/1999
(Continued)

*Primary Examiner* — Thai Ba Trieu
(74) *Attorney, Agent, or Firm* — Alleman Hall Creasman & Tuttle LLP (57) ABSTRACT

An exhaust control apparatus for an engine is provided. The apparatus includes a turbocharger, a high-pressure exhaust gas recirculation (EGR) device, a low-pressure EGR device, and a flap controller. The turbocharger includes a turbine, a compressor, and movable flaps, and rotates the turbine by exhaust gas to drive the compressor so as to boost intake air. The high-pressure EGR device recirculates, within a first engine operating range, the exhaust gas from a position of an exhaust passage upstream of the turbine to a position of an intake passage downstream of the compressor. The low-pressure EGR device recirculates, within a second engine operating range, the exhaust gas from a position of the exhaust passage downstream of the turbine to a position of the intake passage upstream of the compressor. The flap controller controls flap openings.

4 Claims, 5 Drawing Sheets (51) Int. Cl.
*F02B 37/24* (2006.01)
*F02D 41/00* (2006.01)
*F02M 26/05* (2016.01)
*F02M 26/06* (2016.01)
*F02M 26/07* (2016.01)
*F02M 26/09* (2016.01)

(52) U.S. Cl.
CPC ......... *F02D 41/0065* (2013.01); *F02M 26/05* (2016.02); *F02M 26/06* (2016.02); *F02M 26/07* (2016.02); *F02M 26/09* (2016.02); *F02D 2200/0406* (2013.01); *Y02T 10/144* (2013.01); *Y02T 10/47* (2013.01)

(58) Field of Classification Search
CPC ............... F02D 41/0007; F02D 41/005; F02D 41/0065; F02D 2200/0406; Y02T 10/144; Y02T 10/47
USPC .......................................... 60/605.2; 701/108
See application file for complete search history.

(56) References Cited

U.S. PATENT DOCUMENTS

| | | | | |
|---|---|---|---|---|
| 7,770,392 B2* | 8/2010 | Birkner | .................. | F02B 37/18 60/602 |
| 8,006,494 B2* | 8/2011 | Nagae | .................. | F02D 41/0007 60/605.2 |
| 8,108,129 B2* | 1/2012 | Nakayama | .......... | F02D 41/0072 701/108 |
| 8,196,404 B2* | 6/2012 | Onishi | ................ | F02D 41/0065 60/605.2 |
| 8,453,446 B2* | 6/2013 | Onishi | ................ | F02D 41/0007 60/605.2 |
| 8,601,813 B2* | 12/2013 | Shutty | ................ | F02D 41/0072 60/605.2 |
| 8,630,787 B2* | 1/2014 | Shutty | ................... | F02D 41/005 60/605.2 |
| 8,751,101 B2* | 6/2014 | Weber | ................ | F02B 29/0493 123/568.12 |
| 9,279,375 B2* | 3/2016 | Kurtz | .................. | F02D 41/0052 |
| 9,470,184 B2* | 10/2016 | Kihara | ................ | F02D 41/0072 |
| 2003/0182049 A1* | 9/2003 | Bale | ...................... | F02M 26/48 701/108 |
| 2009/0132153 A1* | 5/2009 | Shutty | .................... | F02B 37/24 701/108 |
| 2010/0250103 A1* | 9/2010 | Shimo | ................ | F02D 41/0065 701/108 |
| 2010/0300088 A1* | 12/2010 | Joergl | .................... | F02B 37/24 60/602 |
| 2012/0330575 A1* | 12/2012 | Weber | .................... | F02B 37/24 702/50 |
| 2014/0261350 A1* | 9/2014 | Ruth | .................. | F02D 41/0065 123/703 |

FOREIGN PATENT DOCUMENTS

| | | | | |
|---|---|---|---|---|
| JP | 2001280150 A | | 10/2001 | |
| JP | 2007303380 A | | 11/2007 | |
| JP | 2010203305 A | * | 9/2010 | .............. F02B 37/24 |
| JP | 2014118886 A | | 6/2014 | |

\* cited by examiner

EXHAUST CONTROL APPARATUS FOR ENGINE

BACKGROUND

The present invention relates to an exhaust control apparatus for an engine, particularly an exhaust control apparatus for an engine which has a turbocharger and an EGR device.

Conventionally, in order to improve emission performance of engines, exhaust gas recirculation (EGR) devices for recirculating part of exhaust gas within an exhaust passage to an intake passage are known. To achieve such an improvement, arts using two EGR devices including a high-pressure EGR device and a low-pressure EGR device are also known. The high-pressure EGR device recirculates exhaust gas from a position of an exhaust passage upstream of a turbine of a turbocharger to a position of an intake passage downstream of a compressor of the turbocharger, and the low-pressure EGR device recirculates the exhaust gas from a position of the exhaust passage downstream of the turbine of the turbocharger to a position of the intake passage upstream of the compressor of the turbocharger. For example, JP2007-303380A discloses such an art.

Generally, when using such two EGR devices, the high-pressure EGR device is operated within an engine operating range where the engine load and speed are low, and the low-pressure EGR device is operated within an engine operating range where the engine load and speed are higher than the range where the high-pressure EGR device is operated. Note that the engine operating range where the high-pressure EGR device is operated is suitably referred to as the "high-pressure EGR range," and the engine operating range where the low-pressure EGR device is operated is suitably referred to as the "low-pressure EGR range."

As turbochargers, variable geometry turbochargers (VGTs) provided with a plurality of movable flaps (i.e., movable vanes or nozzle vanes) around a turbine thereof are conventionally known. JPH09-280119A discloses a system using such a turbocharger and an EGR device. The system mechanically fixes flap openings to a predetermined opening when the exhaust gas is recirculated by the EGR device.

Incidentally, within the high-pressure EGR range, the flap openings of the turbocharger are preferably controlled while giving the highest priority to the controllability of the exhaust gas recirculation performed by the high-pressure EGR device, so as to improve ignitability and emission performance of the engine. Specifically, within the high-pressure EGR range, it is not preferable for an exhaust gas pressure to be changed by the operation of the turbocharger.

On the other hand, within the low-pressure EGR range, the flap openings of the turbocharger are preferably controlled to cause the turbocharger to operate to a certain extent while securing the controllability of the exhaust gas recirculation performed by the low-pressure EGR device. Specifically, since the length of the path for the exhaust gas to be recirculated by the low-pressure EGR device is long, the flap openings are preferably controlled while taking into consideration that the responsiveness of the exhaust gas recirculation by the low-pressure EGR device is low.

Thus, the flap openings of the turbocharger are preferably controlled according to the high-pressure EGR range and the low-pressure EGR range individually. Such control of the flap openings according to the individual EGR ranges is disclosed in neither JP2007-303380A nor JPH09-280119A.

SUMMARY

The present invention is made in view of the above situations and aims to provide an exhaust control apparatus for an engine, which suitably controls flap openings of a turbocharger according to a high-pressure EGR range and a low-pressure EGR range individually.

According to an aspect of the present invention, an exhaust control apparatus for an engine is provided. The exhaust control apparatus for the engine includes a turbocharger, a high-pressure EGR device, a low-pressure EGR device, and a flap controller. The turbocharger includes a turbine, a compressor, and movable flaps, and rotates the turbine by exhaust gas to drive the compressor so as to boost intake air, the turbine provided in an exhaust passage of the engine, the compressor provided in an intake passage of the engine, the movable flaps being configured to adjust a turbocharging pressure. The high-pressure EGR device recirculates, within a first engine operating range where an engine load and an engine speed are low, the exhaust gas from a position of the exhaust passage upstream of the turbine of the turbocharger to a position of the intake passage downstream of the compressor of the turbocharger. The low-pressure EGR device recirculates, within a second engine operating range where the engine load and the engine speed are higher than the first engine operating range, the exhaust gas from a position of the exhaust passage downstream of the turbine of the turbocharger to a position of the intake passage upstream of the compressor of the turbocharger. The flap controller controls flap openings that are openings of the flaps of the turbocharger. The flap controller fixes the flap openings to a predetermined opening while the high-pressure EGR device recirculates the exhaust gas, and the flap controller sets the flap openings to an opening according to an engine operating state while the low-pressure EGR device recirculates the exhaust gas.

With the above configuration, since the flap openings (VGT opening) are fixed to the predetermined opening while the high-pressure EGR device is operated, an exhaust air pressure is controlled not to vary so that the controllability of the exhaust gas recirculation by the high-pressure EGR device can effectively be secured, and the ignitability and the emission performance of the engine can be improved. Further, with the above configuration, while the low-pressure EGR device is operated, the flap openings are controlled according to the engine operating state (specifically, feed-forward control, i.e., open control) and the exhaust gas pressure is controlled by the gradual change of the flap openings. Thus, the change in load of the turbocharger is made gradual, and the controllability of the exhaust gas recirculation by the low-pressure EGR device can suitably be secured. As a result, an oxygen concentration required for achieving a requested fuel injection amount of fuel can suitably be achieved, and the restriction applied to the fuel injection amount for reducing smoke produced in the engine can be loosened, and further, the fuel consumption and the emission performance can also be improved.

When a state where the exhaust gas is recirculated by the low-pressure EGR device is shifted to a state where the exhaust gas is recirculated by neither the high-pressure EGR device nor the low-pressure EGR device, the flap controller preferably controls the flap openings according to the engine operating state, and then controls the flap openings such that an actual turbocharging pressure reaches a target turbocharging pressure according to the engine operating state.

With the above configuration, when the state where the low-pressure EGR device is operated is shifted to the state where neither the high-pressure EGR device nor the low-pressure EGR device is operated, a control of dynamically changing the flap openings according to the target turbocharging pressure (turbocharging pressure feedback control)

is not performed immediately, and the flap openings are controlled according to the engine operating state (feedforward control). Thus, a linear acceleration and a fuel consumption improvement can be achieved while securing the reliability of the turbocharger.

During a period after the recirculation of the exhaust gas by the low-pressure EGR device is stopped until a difference between the actual turbocharging pressure and the target turbocharging pressure becomes lower than a predetermined value, the flap controller preferably continues controlling the flap openings according to the engine operating state, and after the difference between the actual turbocharging pressure and the target turbocharging pressure becomes lower than the predetermined value, the flap controller preferably controls the flap openings such that the actual turbocharging pressure reaches the target turbocharging pressure.

With the above configuration, during the period after the operation of the low-pressure EGR device is stopped until the difference between the actual turbocharging pressure and the target turbocharging pressure becomes lower than the predetermined value, since the control of the flap openings according to the engine operating state (feedforward control) is continued, the linear acceleration and the fuel consumption improvement can effectively be achieved while securing the reliability of the turbocharger effectively.

In the case where the low-pressure EGR device recirculates the exhaust gas, the flap controller preferably controls the flap openings while restricting a changing rate of the flap openings below a predetermined value.

With the above configuration, in controlling the flap openings according to the engine operating state while the low-pressure EGR device is operated, since the changing rate of the flap openings is restricted, the flap openings are gradually changed and the controllability of the exhaust gas recirculation by the low-pressure EGR device can effectively be secured.

DETAILED DESCRIPTION OF EMBODIMENT

Hereinafter, an exhaust control apparatus for an engine according to one embodiment of the present invention is described with reference to the appended drawings.
<System Configuration>

First, an engine system to which an exhaust control apparatus for an engine according to this embodiment of the present invention is applied is described with reference to FIG. 1 which is a schematic configuration view illustrating an engine system 200 to which an exhaust control apparatus for an engine according to this embodiment of the present invention is applied.

Figure 1:
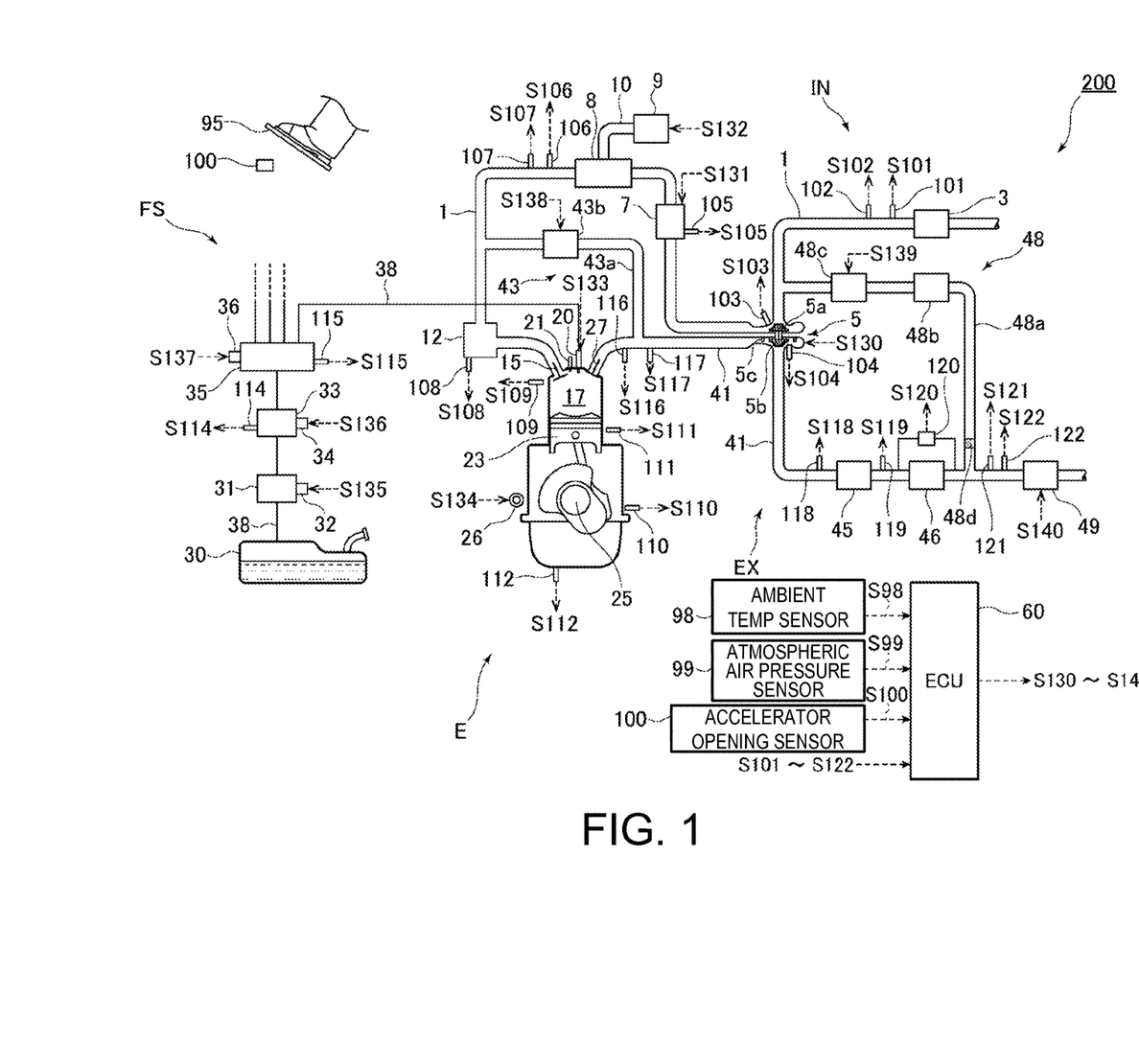
FIG. 1 is a schematic configuration view illustrating an engine system to which an exhaust control apparatus for an engine according to one embodiment of the present invention is applied.

As illustrated in FIG. 1, the engine system 200 mainly includes an engine E which is a diesel engine, an intake system IN for supplying intake air into the engine E, a fuel supply system FS for supplying fuel to the engine E, an exhaust system EX for discharging exhaust gas of the engine E, sensors 99 to 122 for detecting various statuses regarding the engine system 200, and an Electronic Control Unit (ECU) 60 for controlling the engine system 200.

First, the intake system IN has an intake passage 1 through which the intake air passes. The intake passage 1 is provided with, from the upstream side, an air cleaner 3 for purifying air introduced from outside, a compressor 5a provided to a turbocharger 5 and for increasing an intake air pressure by compressing the intake air passing therethrough, an intake shutter valve 7 for adjusting a flow rate of the intake air passing therethrough, an electric water pump 9 for controlling a flow rate of a coolant to be supplied to a water-cooled intercooler 8, a coolant passage 10 connecting the intercooler 8 with the electric water pump 9 and for recirculating the coolant therebetween, the water-cooled intercooler 8 for cooling the intake air by using the coolant passing therethrough, and a surge tank 12 for temporarily storing the intake air to be supplied to the engine E.

Further, the intake system IN is provided with various sensors 101 to 103 and 105 to 108: an airflow sensor 101 for detecting an intake air amount and an intake air temperature sensor 102 for detecting an intake air temperature are provided at a position of the intake passage 1 immediately downstream of the air cleaner 3; a turbocharger speed sensor 103 for detecting a rotational speed of the compressor 5a is provided to the compressor 5a of the turbocharger 5; an intake shutter valve position sensor 105 for detecting an opening of the intake shutter valve 7 is provided to the intake shutter valve 7; an intake air temperature sensor 106 for detecting an intake air temperature and an intake air pressure sensor 107 for detecting an intake air pressure are provided at positions of the intake passage 1 immediately downstream of the intercooler 8; and an intake manifold temperature sensor 108 for detecting an intake air temperature within the surge tank 12 is provided to the surge tank 12. The sensors 101 to 103 and 105 to 108 provided to the intake system IN output detection signals S101 to S103 and S105 to S108 corresponding to the detected parameters, respectively, to the ECU 60.

Next, the engine E includes an intake valve 15 for introducing the intake air supplied from the intake passage 1 (specifically, the intake manifold) into a combustion chamber 17, a fuel injection valve 20 for injecting the fuel to the combustion chamber 17, a glow plug 21 which is a supplementary heat source for securing ignitability when, for example, starting the engine E, a piston 23 for reciprocating with force caused by combustion of mixture gas within the combustion chamber 17, a crankshaft 25 for rotating with force caused by the reciprocation of the piston 23, and an exhaust valve 27 for discharging to the exhaust passage 41 exhaust gas produced by the combustion of mixture gas within the combustion chamber 17. Further, the engine E is provided with an alternator 26 for generating power by using the output of the engine E.

Moreover, the engine E is provided with a coolant temperature sensor 109 for detecting a temperature of the coolant for cooling the engine E, a crank angle sensor 110 for detecting a crank angle of the crankshaft 25, an oil-pressure/temperature sensor 111 for detecting an oil pressure and/or an oil temperature, and an optical oil level sensor 112 for detecting an oil level. The sensors 109 to 112 provided to the engine E output detection signals S109 to S112 corresponding to the detected parameters, respectively, to the ECU 60.

Next, the fuel supply system FS includes a fuel tank 30 for storing the fuel, and a fuel supply passage 38 for supplying the fuel from the fuel tank 30 to the fuel injection valve 20. The fuel supply passage 38 is provided with, from the upstream side, a low-pressure fuel pump 31, a high-pressure fuel pump 33, and a common rail 35. Moreover, a fuel warmer 32 is provided to the low-pressure fuel pump 31, a fuel pressure regulator 34 is provided to the high-pressure fuel pump 33, and a common rail depressurizing valve 36 is provided to the common rail 35.

Further, in the fuel supply system FS, a fuel temperature sensor 114 for detecting a fuel temperature is provided to the high-pressure fuel pump 33, and a fuel pressure sensor 115 for detecting a fuel pressure is provided to the common rail 35. The sensors 114 and 115 provided to the fuel supply system FS output detection signals S114 and S115 corresponding to the detected parameters, respectively, to the ECU 60.

Next, the exhaust system EX includes the exhaust passage 41 where the exhaust gas passes. The exhaust passage 41 is provided with, from the upstream side, a turbine 5b provided to the turbocharger 5 and for driving the compressor 5a as described above by rotating with force of exhaust gas passing therethrough, a diesel oxidation catalyst (DOC) 45 and a diesel particulate filter (DPF) 46 having a purification function for the exhaust gas, and an exhaust shutter valve 49 for adjusting a flow rate of the exhaust gas passing therethrough. The DOC 45 is a catalyst for oxidizing hydrocarbons (HC) and carbon monoxide (CO) by using oxygen within the exhaust gas, so as to convert them into water and carbon dioxide. The DPF 46 is a filter for capturing particulate matter (PM) within the exhaust gas.

Further, in the exhaust system EX, an exhaust gas pressure sensor 116 for detecting an exhaust gas pressure and an exhaust gas temperature sensor 117 for detecting an exhaust gas temperature are provided at positions of the exhaust passage 41 upstream of the turbine 5b of the turbocharger 5, exhaust gas temperature sensors 118 and 119 for detecting an exhaust gas temperature are provided immediately upstream of the DOC 45 and between the DOC 45 and the DPF 46, respectively, a DPF pressure difference sensor 120 for detecting a difference in exhaust gas pressure between the upstream and downstream sides of the DPF 46 is provided to the DPF 46, a linear $O_2$ sensor 121 for detecting an oxygen concentration and an exhaust gas temperature sensor 122 for detecting an exhaust gas temperature are provided at positions of the exhaust passage 41 immediately downstream of the DPF 46. The sensors 116 to 122 provided to the exhaust system EX output detection signals S116 to S122 corresponding to the detected parameters, respectively, to the ECU 60.

Moreover, in this embodiment, the turbocharger 5 is configured to be small in size so as to efficiently perform turbocharging even when the exhaust energy is low and the turbocharger 5 rotates at a low speed, and the turbocharger 5 is provided with a plurality of movable flaps 5c circumferentially surrounding the turbine 5b. The turbocharger 5 is configured as a variable geometry turbocharger (VGT) changeable of a cross-sectional area of a flow path of the exhaust gas flowing toward the turbine 5b (nozzle cross-sectional area) by the flaps 5c. For example, the flaps 5c are turned by an actuator via an electromagnetic valve which adjusts a negative pressure acting on a diaphragm. Moreover, a VGT opening sensor 104 for detecting openings of the flaps 5c (i.e., flap openings; hereinafter, suitably comprehensively referred to as the "VGT opening") based on a position of the actuator is provided. The VGT opening sensor 104 outputs a detection signal S104 corresponding to the detected VGT opening, to the ECU 60.

Here, the flaps 5c of the turbocharger 5 of this embodiment of the present invention are described in detail with reference to FIG. 2 which is an enlarged vertical-cross-sectional view of a schematic configuration of a turbine chamber 157a of the turbocharger 5.

Figure 2:
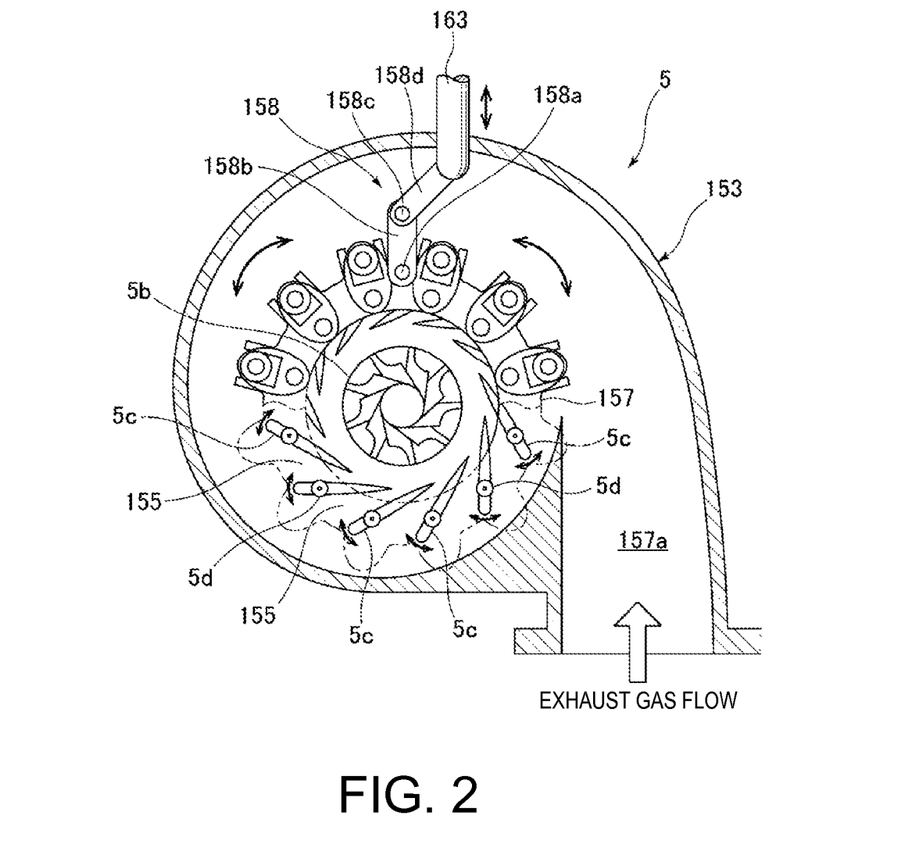
FIG. 2 is an enlarged vertical-cross-sectional view of a turbine chamber of a turbocharger of the embodiment of the present invention.

As illustrated in FIG. 2, the turbine chamber 157a formed inside a turbine casing 153 is provided with the plurality of movable flaps 5c surrounding the turbine 5b that is disposed in a substantially center section of the turbine chamber 157a. Each flap 5c is turnably supported by a spindle 5d penetrating a side wall of the turbine chamber 157a. The flap 5c turns in clockwise fashion in FIG. 2 around the spindle 5d. Nozzles 155 are formed between the flaps 5c, respectively. When each flap 5c inclines closer to an adjacent flap thereto, an opening of each nozzle 155 (nozzle cross-sectional area) is reduced and high turbocharging efficiency can be obtained even when the exhaust flow rate is low. On the other hand, when each flap Sc is turned in the opposite direction so as to incline farther from an adjacent flap thereto, the nozzle cross-sectional area becomes larger, and therefore, an airflow resistance is reduced and the turbocharging efficiency can be improved even when the exhaust flow rate is high.

Further, a ring member 157 is coupled to a rod 163 of the actuator via a linkage mechanism 158, and when the actuator is activated, each flap 5c is turned via the ring member 157. Specifically, the linkage mechanism 158 includes a coupling pin 158a turnably coupled in its one end part to the ring member 157, a coupling plate member 158b turnably coupled in its one end part to the other end part of the coupling pin 158a, a pillar member 158c coupled, at its one end part, to the other end part of the coupling plate member 158b and penetrating an outer wall of the turbine casing 153, and a coupling plate member 158d coupled in its one end part to a projecting end part (i.e., the other end part) of the pillar member 158c. The projecting end part projects outside the turbine casing 153. The other end part of the coupling plate member 158d is turnably coupled to the rod 163 of the actuator by a coupling pin (not illustrated).

Returning to FIG. 1, the engine system 200 of this embodiment also includes a high-pressure EGR device 43 and a low-pressure EGR device 48. The high-pressure EGR device 43 includes a high-pressure EGR passage 43a connecting the exhaust passage 41 at a position upstream of the turbine 5b of the turbocharger 5 with the intake passage 1 at a position downstream of the compressor 5a of the turbocharger 5 (downstream of the intercooler 8 to be specific), and a high-pressure EGR valve 43b for adjusting a flow rate of the exhaust gas passing through the high-pressure EGR passage 43a. The low-pressure EGR device 48 includes a low-pressure EGR passage 48a connecting the exhaust passage 41 at a position downstream of the turbine 5b of the turbocharger 5 (a position downstream of the DPF 46 and upstream of the exhaust shutter valve 49 to be specific) with the intake passage 1 at a position upstream of the compressor 5a of the turbocharger 5, a low-pressure EGR cooler 48b for cooling the exhaust gas passing through the low-pressure EGR passage 48a, a low-pressure EGR valve 48c for adjusting a flow rate of the exhaust gas passing through the low-pressure EGR passage 48a, and a low-pressure EGR filter 48d.

An exhaust gas amount recirculated to the intake system IN by the high-pressure EGR device 43 (hereinafter, referred to as the "high-pressure EGR gas amount") is substantially determined based on the exhaust gas pressure in the part upstream of the turbine 5b of the turbocharger 5, the intake air pressure produced based on the opening of the intake shutter valve 7, and an opening of the high-pressure EGR valve 43b. Further, an exhaust gas amount recirculated to the intake system IN by the low-pressure EGR device 48 (hereinafter, referred to as the "low-pressure EGR gas amount") is substantially determined based on the intake air pressure in the part upstream of the compressor 5a of the turbocharger 5, the exhaust gas pressure produced based on the opening of the exhaust shutter valve 49, and an opening of the low-pressure EGR valve 48c.

Figure 3:
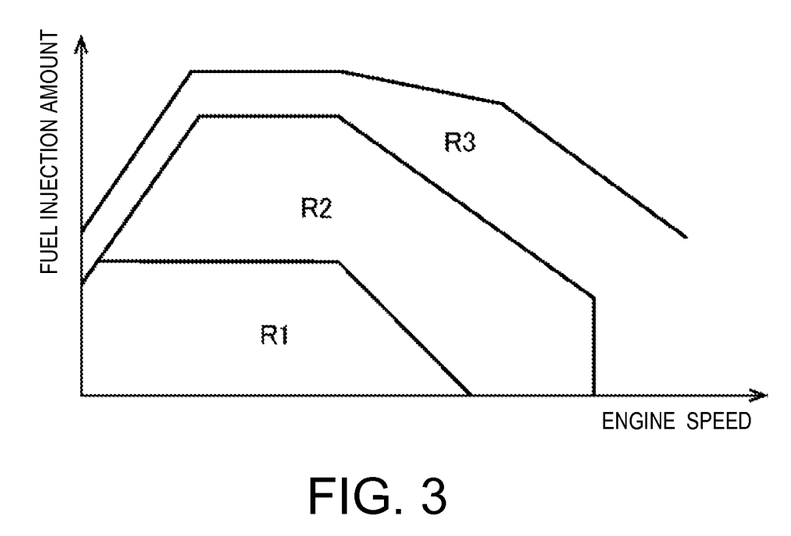
FIG. 3 is a chart for describing a high-pressure EGR range, a low-pressure EGR range, and a no-EGR range of the embodiment of the present invention.

Here, an operating range of the engine E where the high-pressure EGR device 43 is operated (high-pressure EGR range) and an operating range of the engine E where the low-pressure EGR device 48 is operated (low-pressure EGR range) are described with reference to FIG. 3. FIG. 3 is a chart schematically illustrating the high-pressure EGR range, the low-pressure EGR range, and a no-EGR range, in which the lateral axis indicates engine speed and the vertical axis indicates fuel injection amount (corresponding to engine load).

As illustrated in FIG. 3, an operating range R1 of the engine E (corresponding to the first engine operating range) where the engine load and the engine speed are low is the high-pressure EGR range where the high-pressure EGR device 43 is operated, and an operating range R2 of the engine E (corresponding to the second engine operating range) where the engine load and the engine speed are higher than the high-pressure EGR range is the low-pressure EGR range where the low-pressure EGR device 48 is operated. More specifically, part of the low-pressure EGR range R2 (range near the boundary with the high-pressure EGR range R1) is a range where not only the low-pressure EGR device 48 but also the high-pressure EGR device 43 are operated, in other words, a combined-use range of the high-pressure EGR device 43 and the low-pressure EGR device 48. Moreover, an operating range R3 of the engine E defined to cover engine loads and engine speeds higher than those within the low-pressure EGR range R2 is a range where neither the high-pressure EGR device 43 nor the low-pressure EGR device 48 is operated (hereinafter, suitably referred to as the "no-EGR range").

Returning to FIG. 1, the ECU 60 of this embodiment controls the respective components of the engine system 200 based on detection signals S98 to S100 outputted from an ambient temperature sensor 98 for detecting an ambient air temperature, an atmospheric air pressure sensor 99 for detecting an atmospheric air pressure, and an accelerator opening sensor 100 for detecting a position of an acceleration pedal 95 (accelerator opening), respectively, in addition to the detection signals S101 to S122 from the various sensors 101 to 122 described above. Specifically, the ECU 60 outputs a control signal S130 to the actuator (not illustrated) for driving the flaps 5c, so as to control the openings of the flaps 5c of the turbine 5b of the turbocharger 5 (VGT opening). Further, the ECU 60 outputs a control signal S131 to an actuator (not illustrated) for driving the intake shutter valve 7, so as to control the opening of the intake shutter valve 7. Moreover, the ECU 60 outputs a control signal S132 to the electric water pump 9, so as to control the flow rate of the coolant to be supplied to the intercooler 8. Further, the ECU 60 outputs a control signal S133 to the fuel injection valve 20, so as to control the fuel injection amount for the engine E, etc. Moreover, the ECU 60 outputs control signals S134, S135, S136 and S137 to the alternator 26, the fuel warmer 32, the fuel pressure regulator 34, and the common rail depressurizing valve 36, so as to control them, respectively. Further, the ECU 60 outputs a control signal S138 to an actuator (not illustrated) for driving the high-pressure EGR valve 43b, so as to control the opening of the high-pressure EGR valve 43b. Moreover, the ECU 60 outputs a control signal S139 to an actuator (not illustrated) for driving the low-pressure EGR valve 48c, so as to control the opening of the low-pressure EGR valve 48c. Furthermore, the ECU 60 outputs a control signal S140 to an actuator (not illustrated) for driving the exhaust shutter valve 49, so as to control the opening of the exhaust shutter valve 49.

<Basic Control>

Figure 4:
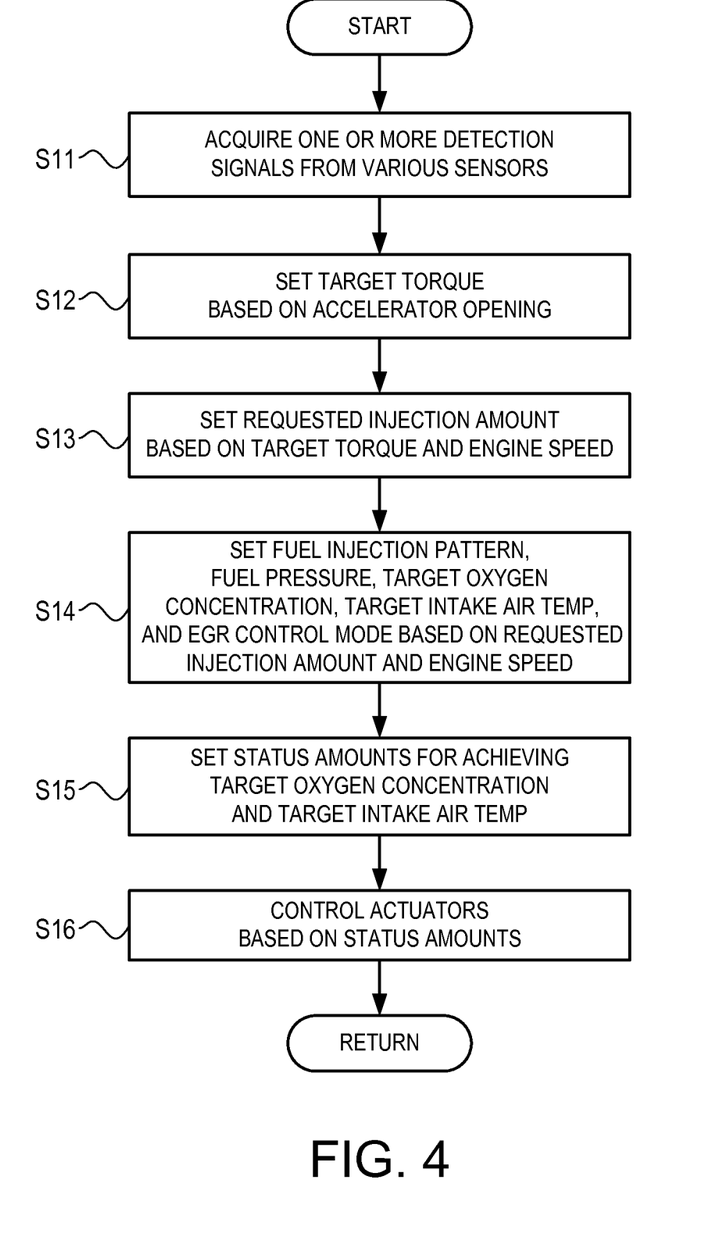
FIG. 4 is a flowchart illustrating a basic control of the embodiment of the present invention.

Next, a basic control performed by the engine system 200 of this embodiment of the present invention is described. FIG. 4 is a flowchart illustrating the basic control of this embodiment. In this flow, a control to achieve a target oxygen concentration and a target intake air temperature, for example, according to a requested injection amount of fuel is performed. Further, this flow is repeated at a predetermined cycle by the ECU 60.

First at S11, the ECU 60 acquires at least one of the detection signals S98 to S122 outputted from the various sensors 98 to 122 described above.

Next at S12, the ECU 60 sets a target torque to be outputted from the engine E based on the accelerator opening detected by the accelerator opening sensor 100 (corresponding to the detection signal S100).

Then at S13, the ECU 60 sets the requested injection amount to be injected from the fuel injection valve 20 based on the target torque set at S12 and the engine speed.

Subsequently at S14, based on the requested injection amount and the engine speed set at S13, the ECU 60 sets a fuel injection pattern, a fuel pressure, the target oxygen concentration, the target intake air temperature, and an EGR control mode (a mode of operating one or both of the high-pressure and low-pressure EGR devices 43 and 48, or a mode of operating neither the high-pressure EGR device 43 nor low-pressure EGR device 48).

Next at S15, the ECU 60 sets status amounts for achieving the target oxygen concentration and the target intake air temperature set at S14. For example, the status amounts include the exhaust gas amount recirculated to the intake system IN by the high-pressure EGR device 43 (high-pressure EGR gas amount), the exhaust gas amount recirculated to the intake system IN by the low-pressure EGR device 48 (low-pressure EGR gas amount), and the turbocharging pressure caused by the turbocharger 5.

Subsequently at S16, the ECU 60 controls the actuators for driving the respective components of the engine system 200 based on the status amounts set at S15. In this case, the ECU 60 sets restriction values or restricted ranges according to the status amounts, sets control amounts of the actuators such that the status values follow the restrictions within the restriction values or restriction ranges, respectively, and performs the controls.

<VGT Opening Control>

Hereinafter, a VGT opening control of this embodiment of the present invention is described.

First, an outline of the VGT opening control of this embodiment of the present invention is described. In this embodiment, the ECU 60 controls the openings of the flaps 5c of the turbocharger 5 (VGT opening) differently among the case where the high-pressure EGR device 43 is operated (high-pressure EGR range R1), the case where the low-pressure EGR device 48 is operated (low-pressure EGR range R2), and the case where neither the high-pressure EGR device 43 nor the low-pressure EGR device 48 is operated (no-EGR range R3). Note that the ECU 60 may be referred to as the "flap controller."

Specifically, while the high-pressure EGR device 43 is operated, the ECU 60 fixes the VGT opening to a predetermined opening, in other words, the VGT opening is fixed to an unvarying opening. In this manner, the exhaust air pressure is controlled not to vary so that the controllability of the exhaust gas recirculation by the high-pressure EGR device 43 (the controllability used here means control performance for achieving a desirable high-pressure EGR gas amount by controlling the high-pressure EGR valve 43b, the intake shutter valve 7, etc.) is secured. Note that when the VGT opening is controlled as above, the turbocharger 5 simply functions as an exhaust resistor, and hardly performs turbocharging. Further, the exhaust resistance in this case is substantially steady.

In another case, while only the low-pressure EGR device 48 is operated without operating the high-pressure EGR device 43, the ECU 60 controls the VGT opening to an opening according to an operation state of the engine E. Specifically, the ECU 60 refers to a map associated with the VGT opening to be set with respect to the engine speed and the fuel injection amount, and sets the VGT opening to an opening corresponding to a current engine speed and a current fuel injection amount. In this case, the ECU 60 sets the VGT opening according to the engine speed and fuel injection amount, and does not change the VGT opening according to a target turbocharging pressure. Specifically, based on the engine speed and the fuel injection amount, the ECU 60 changes the VGT opening by an F/F control (feedforward control, i.e., open control), and does not dynamically change the VGT opening by a turbocharging pressure F/B control (feedback control) of bringing an actual turbocharging pressure to the target turbocharging pressure. Further, the ECU 60 changes the VGT opening while restricting a changing rate of the VGT opening below a predetermined value.

According to such a VGT opening control, the exhaust gas pressure can be controlled by gradually changing the VGT opening. Thus, the change of load of the turbocharger 5 (i.e., the change of the exhaust gas pressure) is made gradual while keeping the turbocharger 5 operated (turbocharging), and the controllability of the exhaust gas recirculation by the low-pressure EGR device 48 (the controllability used here means control performance for achieving a desirable low-pressure EGR gas amount by controlling the low-pressure EGR valve 48c, the exhaust shutter valve 49, etc.) can suitably be secured. Although the low-pressure EGR device 48 has a characteristic of having low responsiveness since the length of the path for the exhaust gas to be recirculated by the low-pressure EGR device 48 is long, when the VGT opening is controlled as described above, since the change of load of the turbocharger 5 is made gradual, the controllability of the low-pressure EGR device 48 can suitably be secured. As a result, a desirable amount of oxygen can suitably be supplied to the engine E, specifically, an oxygen concentration required for applying the requested injection amount can suitably be achieved, and the restriction applied to the fuel injection amount for reducing smoke produced in the engine E can be loosened, and further, the fuel consumption and the emission performance can also be improved.

In further another case, while neither the high-pressure EGR device 43 nor the low-pressure EGR device 48 is operated, the ECU 60 controls the VGT opening by using the turbocharging pressure F/B control of bringing the actual turbocharging pressure to the target turbocharging pressure. Specifically, the ECU 60 uses the intake air pressure detected by the intake air pressure sensor 107 as the actual turbocharging pressure and dynamically changes the VGT opening such that the actual turbocharging pressure is maintained at the target turbocharging pressure, while monitoring the actual turbocharging pressure. In this manner, the actual turbocharging pressure can be caused to suitably follow the target turbocharging pressure.

Further, in this embodiment, in a case of transiting from the state where the low-pressure EGR device 48 is operated to the state where neither the high-pressure EGR device 43 nor the low-pressure EGR device 48 is operated by stopping the operation of the low-pressure EGR device 48, in other words, in a case of transiting from the low-pressure EGR range R2 to the no-EGR range R3, the ECU 60 first performs the VGT opening control similar to the case where the low-pressure EGR device 48 is operated. Specifically, when transiting from the low-pressure EGR range R2 to the no-EGR range R3, the ECU 60 refers to the map associated with the VGT opening to be set with respect to the engine speed and the fuel injection amount, sets the VGT opening to an opening corresponding to a current engine speed and a current fuel injection amount (i.e., changes the VGT opening by the F/F control), and does not immediately perform the turbocharging pressure F/B control of dynamically changing the VGT opening based on the target turbocharging pressure. In this manner, degradation in reliability of the turbocharger 5, sharp acceleration, and deterioration in fuel consumption due to the sharp change of turbocharging pressure (particularly apparent if the turbocharger 5 is formed in small size) caused if the turbocharging pressure F/B control is immediately performed, can be reduced.

More specifically, during a period after the operation of the low-pressure EGR device 48 is stopped, the ECU 60 continues the VGT opening control by such an F/F control until the difference between the actual turbocharging pressure detected by the intake air pressure sensor 107 and the target turbocharging pressure becomes lower than a predetermined value. Then, after the difference between the actual turbocharging pressure and the target turbocharging pressure becomes lower than a predetermined value, the ECU 60 performs the turbocharging pressure F/B control of dynamically changing the VGT opening so that the actual turbocharging pressure is maintained at the target turbocharging pressure.

Figure 5:
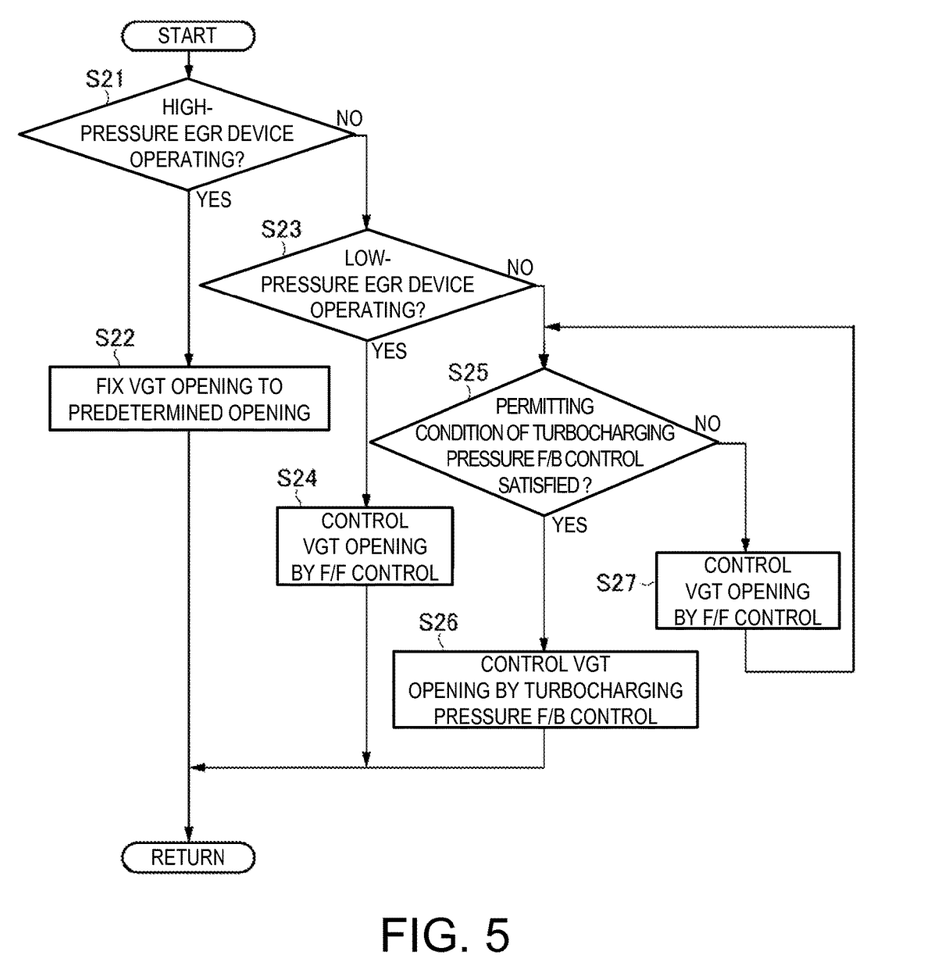
FIG. 5 is a flowchart illustrating a VGT opening control flow of the embodiment of the present invention.

Next, the entire flow of the VGT opening control of this embodiment of the present invention is described in detail with reference to FIG. 5 which is a flowchart illustrating a VGT opening control flow of this embodiment of the present invention. The VGT opening control flow is repeated at a predetermined cycle by the ECU 60. Moreover, the VGT opening control flow is performed when the operation state of the engine E is a state where the operations of the high-pressure and low-pressure EGR devices 43 and 48 are permitted.

First, at S21, the ECU 60 determines whether the high-pressure EGR device 43 is operating. In one example, the ECU 60 performs the determination at S21 by determining whether a current operation state of the engine E is within the high-pressure EGR range R1 illustrated in FIG. 3 (including part of the low-pressure EGR range R2 where the high-pressure and low-pressure EGR devices 43 and 48 are both used to be exact) based on a current engine speed and a current fuel injection amount. In another example, the ECU 60 performs the determination at S21 by determining whether the high-pressure EGR valve 43b of the high-pressure EGR device 43 is opened.

If the high-pressure EGR device 43 is determined to be operating as a result of the determination (S21: YES), the flow proceeds to S22 where the ECU 60 sets the VGT opening to a predetermined opening. For example, the ECU 60 sets the VGT opening to a predetermined opening which is smaller than the VGT opening when the determination at S21 is performed. In this case, the ECU 60 controls the actuator for driving the flaps 5c of the turbocharger 5 so that the actual VGT opening is fixed to the predetermined opening, while monitoring the VGT opening detected by the VGT opening sensor 104. Note that the control of the actuator is not limited to strictly set the VGT opening to the predetermined opening which is a value, and the VGT opening may be set to an opening within a certain small range determined based on the predetermined opening.

On the other hand, if the high-pressure EGR device 43 is determined to be not operating (S21: NO), the flow proceeds to S23 where the ECU 60 determines whether the low-pressure EGR device 48 is operating. In one example, the ECU 60 performs the determination at S23 by determining whether the current operation state of the engine E is within the low-pressure EGR range R2 illustrated in FIG. 3 (excluding the combined-use range of the high-pressure and low-pressure EGR device 43 and 48 to be exact) based on the current engine speed and the current fuel injection amount. In another example, the ECU 60 performs the determination at S23 by determining whether the high-pressure EGR valve 43b of the high-pressure EGR device 43 is closed and the low-pressure EGR valve 48c of the low-pressure EGR device 48 is opened.

If the low-pressure EGR device 48 is determined to be operating as a result of the determination (S23: YES), the flow proceeds to S24 where the ECU 60 controls the VGT opening by the F/F control. Specifically, the ECU 60 refers to the map associated with the VGT opening to be set with respect to the engine speed and the fuel injection amount, and sets the VGT opening to an opening corresponding to the current engine speed and the current fuel injection amount. Also in this case, the ECU 60 controls the actuator for driving the flaps 5c of the turbocharger 5 so that the actual VGT opening is set to the opening corresponding to the current engine speed and the current fuel injection amount, while monitoring the VGT opening detected by the VGT opening sensor 104. Moreover, the map described above is created in advance based on experiment(s) and/or predetermined formula(s), and provides a VGT opening with which a turbocharging pressure close to the target turbocharging pressure can be obtained without degrading the fuel consumption and the over-speeding rotation of the turbine 5b of the turbocharger 5 does not occur for each pair of an engine speed and a fuel injection amount. For example, in this map, a certain range of VGT opening is defined, and the VGT opening set by the F/F control is restricted within the certain range.

Further, in controlling the VGT opening by the F/F control, the ECU 60 restricts the changing rate of the VGT opening. Specifically, the ECU 60 restricts the changing rate of the VGT opening to be lower than the predetermined value so as to gradually change the VGT opening. Since the responsiveness to the VGT opening change is low due to the long length of the path for the exhaust gas to be recirculated by the low-pressure EGR device 48, the changing rate of the VGT opening is restricted to compensate the low responsiveness.

On the other hand, if the low-pressure EGR device 48 is determined to be not operating (S23: NO), in other words, neither the high-pressure EGR device 43 nor the low-pressure EGR device 48 is operated, the flow proceeds to S25 where the ECU 60 determines whether a permitting condition of the turbocharging pressure F/B control is satisfied. Specifically, the ECU 60 uses, as the permitting condition of the turbocharging pressure F/B control, one of the following conditions: (1) a difference (absolute value) between the actual turbocharging pressure detected by the intake air pressure sensor 107 and the target turbocharging pressure is lower than the predetermined value; (2) a change amount of the actual turbocharging pressure detected by the intake air pressure sensor 107 is lower than a predetermined value; and (3) an operation amount of the acceleration pedal 95 (specifically, a change amount of the accelerator opening detected by the accelerator opening sensor 100) is lower than a predetermined value.

If the permitting condition of the turbocharging pressure F/B control is determined as satisfied as a result of the determination (S25: YES), the flow proceeds to S26 where the ECU 60 controls the VGT opening by the turbocharging pressure F/B control. Specifically, the ECU 60 dynamically changes the VGT opening such that the actual turbocharging pressure is maintained at the target turbocharging pressure, while monitoring the actual turbocharging pressure detected by the intake air pressure sensor 107. In this case, the ECU 60 sets the target turbocharging pressure based on the engine speed, the fuel injection amount, etc., and performs the F/B control on the VGT opening to achieve the target turbocharging pressure.

On the other hand, if the permitting condition of the turbocharging pressure F/B control is determined as not satisfied (S25: NO), the flow proceeds to S27 where the ECU 60 controls the VGT opening by the F/F control without performing the turbocharging pressure F/B control. Specifically, the ECU 60 refers to the map associated with the VGT opening to be set with respect to the engine speed and the fuel injection amount, sets the VGT opening to an opening corresponding to the current engine speed and the current fuel injection amount. This map is created in advance based on experiment(s) and/or predetermined formula(s), and, unlike the map used while the low-pressure EGR device 48 operates at S24 described above, a VGT opening with which linear acceleration can be obtained without deteriorating the fuel consumption (i.e., sharp acceleration does not occur) is associated with each pair of an engine speed and a fuel injection amount.

Note that when controlling the VGT opening by the F/F control at S27, as in the case of controlling the VGT opening by the F/F control at S24, the ECU 60 also restricts the changing rate of the VGT opening to gradually change the VGT opening.

<Operations and Effects>

Next, the operations and effects of the exhaust control device of the engine according to this embodiment of the present invention are described.

According to this embodiment, while the high-pressure EGR device 43 is operated, since the VGT opening is fixed to the predetermined opening, the variation of the exhaust gas pressure is reduced, the controllability of the exhaust gas recirculation by the high-pressure EGR device 43 can be secured, and the ignitability and emission performance of the engine E can be improved. Further, according to this embodiment, while the low-pressure EGR device 48 is operated, the F/F control of setting the VGT opening to the opening corresponding to the operation state of the engine E is performed and the exhaust gas pressure is controlled by the gradual change of the VGT opening. Thus, the change of load of the turbocharger 5 is made gradual while keeping the turbocharger 5 turbocharging, and the controllability of the exhaust gas recirculation by the low-pressure EGR device 48 can be secured. As a result, the oxygen concentration required for applying the requested injection amount can suitably be achieved and the restriction applied to the fuel injection amount for reducing smoke produced in the engine E can be loosened (which surely enables the supply of the requested injection amount to the engine E), and further, the fuel consumption and the emission performance can also be improved. Additionally, by controlling the VGT opening with the map defined to prevent the over-speeding rotation of the turbine 5b of the turbocharger 5, the over-speeding rotation of the turbine 5b can suitably be prevented.

Particularly in this embodiment, in controlling the VGT opening by the F/F control, since the ECU 60 restricts the changing rate of the VGT opening, the VGT opening is gradually changed and the controllability of the exhaust gas recirculation by the low-pressure EGR device 48 can effectively be secured.

Further, in this embodiment, when transiting from the low-pressure EGR range R2 to the no-EGR range R3, since the F/F control of setting the VGT opening to the opening corresponding to the operation state of the engine E instead of immediately performing the turbocharging pressure F/B control, the degradation in reliability of the turbocharger 5 (e.g., breakage of the turbocharger 5), the sharp acceleration, and the deterioration in fuel consumption due to the sharp change of turbocharging pressure which will be caused if the turbocharging pressure F/B control is immediately performed can be reduced. In other words, according to this embodiment, the linear acceleration and the fuel consumption improvement can be achieved while securing the reliability of the turbocharger 5.

Particularly in this embodiment, after the operation of the low-pressure EGR device 48 is stopped, since the VGT opening control by the F/F control continues until the difference between the actual turbocharging pressure and the target turbocharging pressure becomes lower than the predetermined value, such effects can surely be obtained.

<Modifications>

In the above embodiment, the VGT opening is set based on the engine speed and the fuel injection amount in the F/F control of the VGT opening; however, the VGT opening set in such a manner may be corrected according to the ambient air temperature, the atmospheric air pressure, an engine water temperature, etc.

Moreover, in the above embodiment, the example in which the VGT opening control to be performed is switched based on the map illustrated in FIG. 3, in other words, the example in which the VGT opening control is switched depending on which range the operation state of the engine E falls in among the high-pressure EGR range, the low-pressure EGR range, and the no-EGR range, is described; however, it is not limited to this. For example, in view of reliability of the low-pressure EGR device 48 regardless of the map illustrated in FIG. 3, the use of the low-pressure EGR device 48 may be prohibited, in other words, the low-pressure EGR device 48 may not be operated even when the operation state of the engine E is within the low-pressure EGR range, and in such a case, the VGT opening may be controlled by the turbocharging pressure F/B control instead of the F/F control.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

DESCRIPTION OF REFERENCE CHARACTERS

1 Intake Passage
5 Turbocharger
5a Compressor
5b Turbine
5c Flap
41 Exhaust Passage
43 High-pressure EGR Device
43b High-pressure EGR Valve
48 Low-pressure EGR Device
48c Low-pressure EGR Valve
60 ECU
200 Engine System
E Engine

What is claimed is:

1. An exhaust control apparatus for an engine, comprising:
a turbocharger including a turbine, a compressor, and movable flaps surrounding the turbine, and for rotating the turbine by exhaust gas to drive the compressor so as to boost intake air, the turbine provided in an exhaust passage of the engine, the compressor provided in an intake passage of the engine, the movable flaps being configured to adjust a turbocharging pressure;
a high-pressure EGR valve for adjusting, within a first engine operating range where an engine load and an engine speed are low, a flow rate of the exhaust gas passing through a high-pressure EGR passage from a position of the exhaust passage upstream of the turbine of the turbocharger to a position of the intake passage downstream of the compressor of the turbocharger;
a low-pressure EGR valve for adjusting, within a second engine operating range where the engine load and the engine speed are higher than the first engine operating range, a flow rate of the exhaust gas passing through a low-pressure EGR passage from a position of the exhaust passage downstream of the turbine of the turbocharger to a position of the intake passage upstream of the compressor of the turbocharger; and
a controller operatively coupled to at least a sensor configured to detect an engine operating state and flap openings that are openings of the movable flaps of the turbocharger,
wherein the controller is operatively coupled to the high-pressure EGR valve and the low-pressure EGR valve, and the controller is configured to operate either, both, or neither of the EGR valve based on an engine operating range of the detected engine operating state, operating only the high-pressure EGR valve when the detected engine operating state is within the first engine operating range, operating the low-pressure EGR valve when the detected engine operating state is within the second engine operating range, operating both the high-pressure EGR valve and the low-pressure EGR valve when the detected engine operating state is within a predetermined portion of the second engine operating range, and operating neither the high-pressure EGR valve nor the low-pressure EGR valve when the detected engine operating state is within a third engine operating range where the engine load and the engine speed are higher than the second engine operating range;

wherein the controller fixes the flap openings to a predetermined opening while the high-pressure EGR valve allows the exhaust gas to pass through the high-pressure EGR passage; and wherein the controller controls the flap openings according to the detected engine operating state while the low-pressure EGR valve allows the exhaust gas to pass through the low-pressure EGR passage.

2. The apparatus of claim 1, wherein when the detected engine operating range shifts from a range corresponding to a state where the exhaust gas passes through the low-pressure EGR passage to a range corresponding to a state where the exhaust gas passes through neither the high-pressure EGR passage nor the low-pressure EGR passage, the controller controls the flap openings according to the detected engine operating state, and then controls the flap openings such that an actual turbocharging pressure reaches a target turbocharging pressure according to the detected engine operating state, the controller being operatively coupled to at least a sensor configured to detect the actual turbocharging pressure.

3. The apparatus of claim 2, wherein during a period after the exhaust gas passing through the low-pressure EGR passage is stopped by the controller until a difference between the actual turbocharging pressure and the target turbocharging pressure becomes lower than a predetermined value, the controller continues controlling the flap openings according to the detected engine operating state, and after the difference between the actual turbocharging pressure and the target turbocharging pressure becomes lower than the predetermined value, the controller controls the flap openings such that the actual turbocharging pressure reaches the target turbocharging pressure.

4. The apparatus of claim 1, wherein where controller adjusts the low-pressure EGR valve to pass the exhaust gas through the low-pressure EGR passage, the controller controls the flaps openings while restricting a changing rate of the flap openings below a predetermined value.

* * * * *